INVENTOR
PETER M. SAMPATACOS
Edward H. Goodrich
HIS ATTORNEY

United States Patent Office 3,304,138
Patented Feb. 14, 1967

3,304,138
ANTIFRICTION BEARING
Peter M. Sampatacos, Cheshire, Conn., assignor to General Motors Corporation, Detroit, Mich., a corporation of Delaware
Filed Aug. 14, 1964, Ser. No. 389,574
5 Claims. (Cl. 308—195)

This invention relates to a light weight rolling element type of bearing and more particularly to a composite reinforced antifriction bearing capable of withstanding high radial stresses.

Heretofore, antifriction bearings, as ball bearings, have usually been made from high carbon steel wherein the race rings are subjected to expensive time-consuming machining, heat treating and precision grinding operations. In addition to the expensive labor involved, these machining operations produce extensive steel scrap which comprises a very high percentage of the steel actually used for making the finished bearing.

It is, therefore, an object of my invention to provide an improved antifriction bearing involving a minimum amount of wasted material and wherein rolling elements engage reinforced race rings.

It is a further object of this invention to provide an improved antifriction bearing having a pair of radially opposed thin walled race rings which are reinforced by molded backing rings bonded thereto.

It is a further object of this invention to provide an improved antifriction bearing wherein one of the race rings is formed from thin sheet material about which is wound a reinforcing strip embedded in a molded resin.

It is a further object of this invention to provide an improved method for making an antifriction bearing wherein raceways are rollformed in thin metal rings which are thereafter reinforced by a resinous material molded in situ.

Figure 1:
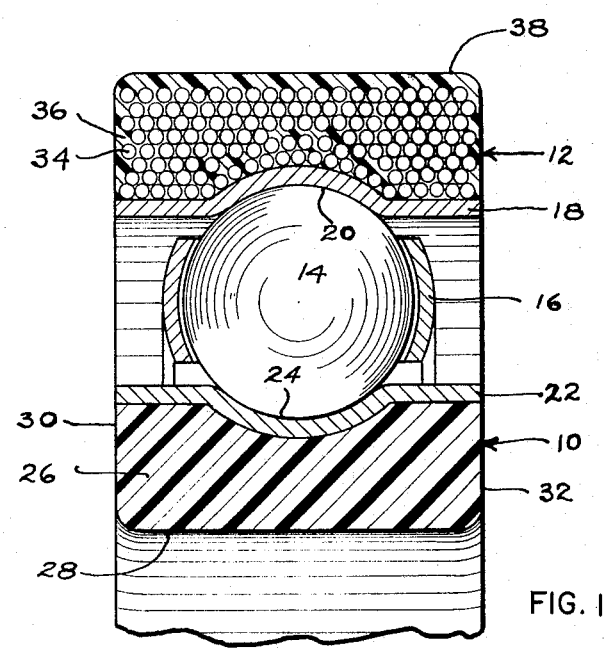
Figure 2:
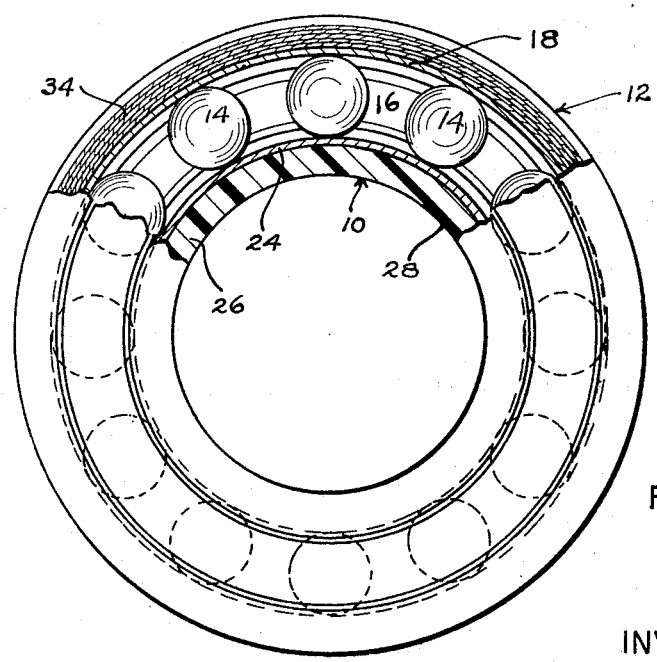

To these ends and to improve generally upon devices of this character, this invention consists in the various matters and the method hereinafter described and claimed. In its broader aspects, the invention is not necessarily limited to the specific arrangements selected for illustrative purposes in the accompanying drawings wherein FIGURE 1 is a fragmentary enlarged cross section showing my improved bearing, and FIGURE 2 is a fragmentary end view of the invention.

As illustrated, a pair of coaxially inner and outer composite race members generally indicated at 10 and 12 are radially positioned by a series of circumferentially spaced rolling elements as balls 14 guided by an annular separator 16. The separator may be provided with circumferentially spaced ball-receiving pockets as is common practice. The balls 14 rollingly engage an outer race ring 18 which may comprise a thin-walled sleeve of suitable metal as a bearing steel having a transversely curved annularly extending raceway 20 which forms a circumferentially extending track for receiving the balls. Similarly, the balls rollingly engage an inner race ring 22 which may comprise a thin-walled sleeve of suitable metal as a bearing steel and having an annularly extending transversely curved raceway 24 for rollingly receiving the balls. Since the inner and outer race rings 22 and 18 are preferably formed of metal having a relatively thin-walled section, the raceways 20 and 24 may be formed by a rolling operation therein thus eliminating a very large amount of scrap that is produced by the usual machining in the commonly used method of antifriction bearing manufacture. If desired, the race rings 18 and 22 may be heat treated and the raceways 20 and 24 may be further finished with a very light grinding operation. Since the initial roll-forming of these raceways produces a precise raceway contour, very little material is wasted in such a grinding operation. However, the raceways 20 and 24 may be produced by suitable machining operations. The inner and outer thin-walled race rings 22 and 18 are preferably formed from suitable cut-off lengths of a tube. However, these race rings may also be made from strip stock rolled to ring form and butt welding the adjacent ends followed by forming the raceways.

The inner race ring 22 is reinforced by a backing ring 26 of molded noncompressible material as a resin which may be a phenolic resin, an epoxy resin, or other suitable material which may be molded in position. Rubber like materials molded in position and vulcanized to a substantially rigid condition, have also been found satisfactory for these backing rings. This backing ring 26 is molded to provide a bore 28 therethrough of suitable size for mounting the bearing on a shaft in a desired position. This molding operation preferably forms the desired flat end faces 30 and 32 which are coextensive with the flat end faces of the race ring 22. The molded backing ring 26 may be heat set to a rigid condition if made of rubber or a like material or of a phenolic-type resin. The backing ring 26 may alternatively be made from a moldable material which chemically sets to rigid form as exemplified by an epoxy resin. It is preferred that the molded backing material be of a type that will bond to the metal race ring.

The thin metal outer race ring 18 may be mounted on a suitable mandrel and wound with a filament or strands of a flexible reinforcing material 34 such as wire, glass fibers, or even a woven strip of suitable flexible fibers. The reinforcing material 34 is wound about the periphery of the outer race ring 18 in overlying convolutions and is preferably wound under tension. The outer race ring with its reinforcing winding 34 is thereafter placed in a mold and a moldable material as rubber or resin of the phenolic or epoxy types, or other suitable material, is molded about and through the winding to provide a rigid backing ring 36 which preferably comprises a material which bonds to the reinforcing winding and also to the periphery of the outer race ring 18.

The mold within which the backing ring 36 is formed is of suitable dimensions to provide on the backing ring 36 desired flat end faces coincident with the end faces of the outer race ring 18 and also respectively in planar relation with the end faces 30 and 32 of the inner composite ring 10. Also, the mold is of suitable dimensions to provide the desired outer cylindrical periphery 38 on the backing ring 36 for mounting the bearing in a housing bore or other required location. The high tensile strength of the reinforcing winding 34 secured in position by the backing ring 36, which of itself acts as a reinforcing member, provides a composite, light-weight, reinforcing bearing race member of very high strength which is easily and inexpensively made.

Similarly, the molded backing material employed for the inner backing ring 26 rigidly supports the inner race ring since the inner backing ring is of noncompressible material. If desired, during the molding operation, the inner backing ring 26 may also be molded around and bonded to an inner metal sleeve positioned within the bore 28 for mounting the bearing on a shaft. Also, the outer backing ring 36 may be molded within and bonded to a thin cylindrical outer metal shell for supporting the outer race ring in mounting position within a housing or the like.

The complement of balls 14 guided by the separator 16 is assembled in the opposing inner and outer raceways 24 and 20 in accordance with conventional practice. The resultant assembly comprises a unit-handling light weight antifriction bearing that is inexpensive to manufacture and which will withstand heavy radial loads due to the rugged structure of the composite race members 10 and 12.

I claim:

1. In an antifriction bearing having a pair of coaxial relatively rotatable annular race members spaced by intervening rolling elements, one of said members including a relatively thin-walled metal race ring having a circumferentially extending rolling element-receiving raceway therein, an elongated strip of flexible material wound in overlying convolutions about the periphery of the race ring, and a backing ring molded about the periphery of said race ring and containing said flexible strip, said backing ring being bonded to the race ring and to the flexible strip to form a rigid backing ring.

2. In an antifriction bearing having a pair of coaxial relatively rotatable annular race members spaced by intervening rolling elements, one of said members including a relatively thin-walled metal sleeve race ring having a circumferentially disposed raceway for the rolling elements, a flexible reinforcing filament wound in binding relation about the periphery of said race ring, and a backing ring molded about the race ring and surrounding the filament, said backing ring being bonded to said filament and bonded to said race ring to form a rigid backing ring.

3. In an antifriction bearing having a pair of coaxial relatively rotatable annular race members spaced by intervening rolling elements, one of said members including a thin-walled metal race ring having an annular raceway for the rolling elements, a woven flexible strip of reinforcing material wound in overlying convolutions about the race ring in binding relation, and a backing ring molded about the race ring and having the flexible reinforcing strip embedded therein, said molded backing ring being bonded to said convolutions and to the periphery of the race ring to form a rigid backing ring.

4. In an antifriction bearing having a pair of coaxial relatively rotatable inner and outer annular race members engaged by an intervening series of rolling elements, said race members including inner and outer thin walled metal race rings having rolling element-receiving raceways therein, a molded backing ring bonded within and supporting the inner race ring, a molded backing ring bonded to and surrounding the outer race ring, and an elongated strip of reinforcing material bound in overlying convolutions about the outer race ring, said strip being embedded within and bonded to said last-mentioned backing ring to form a rigid backing ring.

5. In an antifriction bearing having a pair of coaxial relatively rotatable inner and outer annular race members engaged by an intervening circumferentially disposed series of rolling elements, said race members including inner and outer thin-walled metal race rings having rolling element-receiving raceways therein, a molded backing ring of resinous material bonded within and supporting the inner race ring, a molded backing ring of resinous material bonded to and surrounding the outer race ring, an elongated glass filament tightly wound in reinforcing relation and in overlying convolutions about said outer race ring, said winding being embedded within and bonded to the last-mentioned backing ring to form a rigid backing ring.

References Cited by the Examiner

UNITED STATES PATENTS

| | | | |
|---|---|---|---|
| 2,244,197 | 6/1941 | Hessler | 308—216 |
| 2,324,863 | 7/1943 | Merchant | 308—238 |
| 2,833,029 | 5/1958 | Kearns | 29—452 |

FOREIGN PATENTS

| | | |
|---|---|---|
| 504,539 | 6/1951 | Belgium. |
| 538,782 | 3/1922 | France. |

MARTIN P. SCHWADRON, *Primary Examiner.*

FRANK SUSKO, *Examiner.*